(12) United States Patent
Henning

(10) Patent No.: US 6,402,391 B1
(45) Date of Patent: Jun. 11, 2002

(54) PLUG-AND-SOCKET CONNECTOR FOR OPTICAL FIBERS

(75) Inventor: Wolfram Henning, Neumarkter Strasse 23, D-90584 Allersberg (DE)

(73) Assignee: Wolfram Henning (DE)

(*) Notice: Subject to any disclaimer, the term of this patent is extended or adjusted under 35 U.S.C. 154(b) by 0 days.

(21) Appl. No.: 09/486,054

(22) PCT Filed: Sep. 7, 1998

(86) PCT No.: PCT/EP98/05672

§ 371 (c)(1),
(2), (4) Date: Mar. 28, 2000

(87) PCT Pub. No.: WO99/13365

PCT Pub. Date: Mar. 18, 1999

(30) Foreign Application Priority Data

Sep. 5, 1997 (DE) .......................................... 197 39 052

(51) Int. Cl.[7] ................................................ G02B 6/36
(52) U.S. Cl. .............................. 385/77; 385/60; 385/58
(58) Field of Search ............................. 385/77, 60, 59, 385/89, 78, 72, 58

(56) References Cited

U.S. PATENT DOCUMENTS

| 3,936,145 | A |   | 2/1976 | McCartney ................... 385/58 |
| 4,132,461 | A | * | 1/1979 | Jacques et al. ................ 385/77 |
| 4,380,366 | A |   | 4/1983 | Franken et al. ................ 385/55 |
| 4,469,400 | A | * | 9/1984 | Hakoun ........................ 385/77 |

FOREIGN PATENT DOCUMENTS

| EP | 0016911 A1 | 10/1980 |
| EP | 0570665 A1 | 11/1993 |

* cited by examiner

*Primary Examiner*—Phan T. H. Palmer
(74) *Attorney, Agent, or Firm*—St Onge Steward Johnston & Reens LLC

(57) ABSTRACT

A plug-and-socket connector for optical fibers, comprising a socket where an optical fiber to be connected is retained, and a plug which receives the optical fiber in a centering element which surround the fiber, thus centering it, due to the locking rotating movement into which the optical fiber is inserted when the plug and the socket are connected.

20 Claims, 2 Drawing Sheets

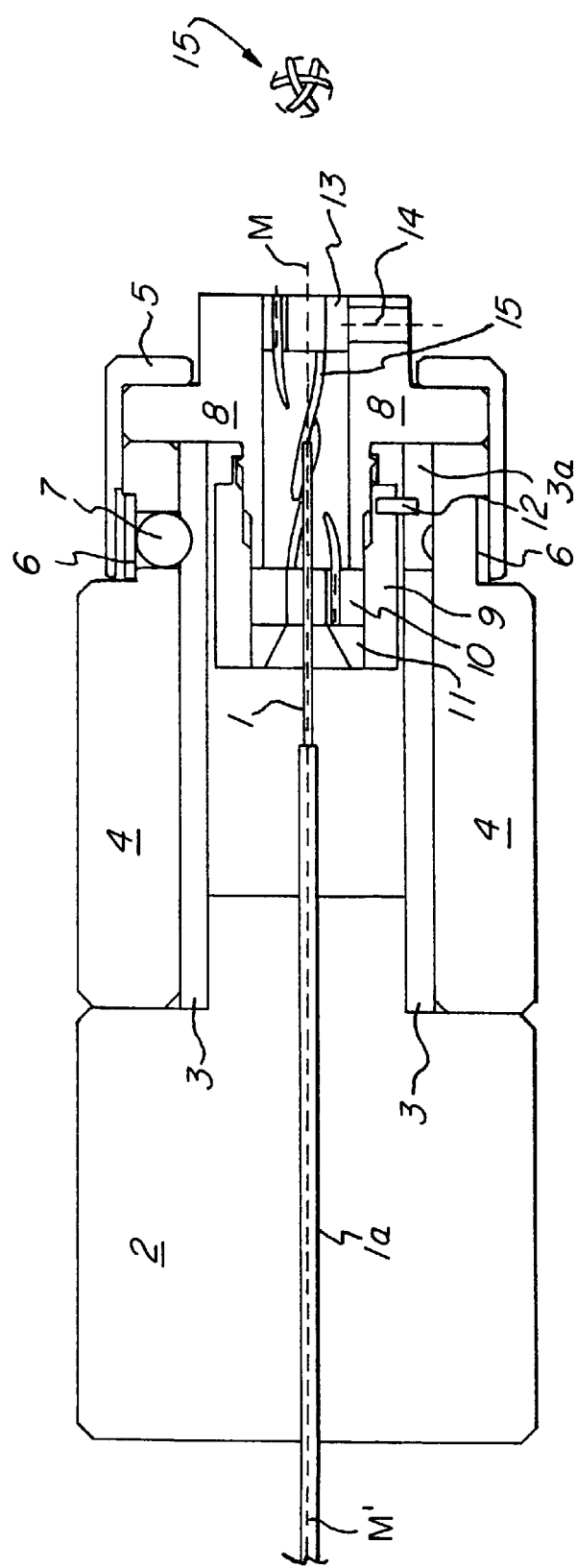
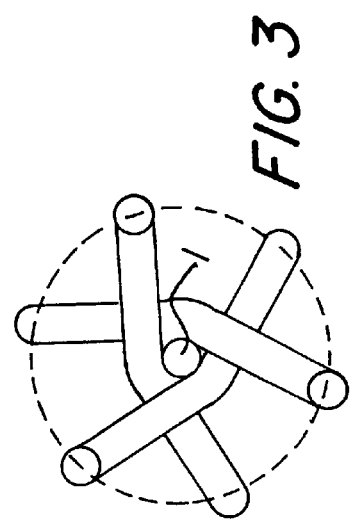
FIG. 2
FIG. 3

PLUG-AND-SOCKET CONNECTOR FOR OPTICAL FIBERS

DESCRIPTION

1. Field of the Invention

The present invention relates to a plug-and-socket connector for optical fibres.

Plug-and-socket connectors of this type are employed for the optical coupling of two optical fibres or for the optical connection between an optical fibre and a light source such as a laser or a light-receiving instrument such as a laser catheter adapted to be introduced into the human body. Apart from the aforementioned applications there are, of course, additional applications in the field of medicine or engineering, e.g. in the field of material processing or laser labeling.

The general term "optical fibre" as used here is to be understood to denote a single fibre (for mono-mode or multi-mode operation) or a bundle of fibres, which consist of any material whatsoever, in the description presented below.

2. Prior Art

Plug-and-socket connectors for optical fibres are generally common and are manufactured, for instance, by the company of Faseroptik Henning GmbH, Allersberg (Germany) in many different types. For an explanation of all terms not described here in more details, and with respect to potential applications, explicit reference is made to these series-produced plug-and-socket connectors.

Plug-and-socket connectors may comprise, for instance, a socket wherein the optical fibre to be coupled is maintained as well as a plug which receives the element to be connected to the optical fibre, such as another optical fibre or an optical element or a joining optical system, respectively.

In the known plug-and-socket connectors a centering element is provided in the connector, into which the optical fibres are inserted when the socket and the plug are connected.

Particularly when the plug-and-socket connector is intended to enable the coupling of the optical fibre with high efficiency, it is necessary that the plug-and-socket connector and the centering element provided therein, be high-precision elements that cannot be manufactured, as a rule, by processes such as an injection moulding technique.

The known plug-and-socket connectors are therefore complex and hence expensive. The current plug-and-socket connectors are thus too expensive, particularly for applications such as disposable laser catheters.

Above all, however, the known plug-and-socket connectors are not suitable for coupling optical fibres of different diameters because the centering elements are each designed only for optical fibres having a particular diameter.

3. Object of the Invention

The present invention is now based on the problem of improving a plug-and-socket connector in such a way that a high-precision coupling of optical fibres having a varying diameter will be possible at a comparatively low expenditure in terms of structure.

One inventive solution to this problem is defined in Patent claim 1. Improvements of the invention are the subject matters of claims 2 et seq.

In accordance with the invention the plug comprises at least three wrap springs. In the released condition the wrap springs are straight; as a result of the locking rotating movement they surround the fibre for centering it. It is also possible, of course, to provide four or more wrap springs.

Due to the inventive wrap-around longitudinal centering, a centric connection of fibres even of different diameters is achieved, which may vary by several factors in particular. Moreover, the centering effect is even achieved with high precision when the individual elements have a comparatively low precision as it is common on injection-moulded parts.

The locking rotating movement may be performed in particular by turning the socket. When the socket is turned one part of the plug is rotated, for instance, on which one end of the wrap springs is retained.

If a funnel-shaped centering element is arranged ahead of the wrap springs along the direction of insertion, the insertion of the optical fibres is facilitated. This centering element may be held on that part, in particular, on which one end of the wrap spring are retained.

It is particularly preferable to provide a second fibre holder for another optical fibre or an optical system—such as an imaging system—in the plug, with the wrap springs centering the optical fibre to be coupled on the center axis of this system. The other end of the wrap springs may also be mounted on the second fibre holder.

To enable the operation with parts that are manufactured with a comparatively low precision, it is moreover expedient to provide the second fibre holder with adjusting means.

In another embodiment it is preferred that the plug and the socket can be locked by means of a snap-in connector which may comprise a ball in particular, so as to achieve a reliable plug-in connection.

BRIEF DESCRIPTION OF THE DRAWING

The invention will be described in the following by an exemplary embodiment, without any restriction of the general inventive idea, and with reference to the drawing which is referred to explicitly as far as the disclosure of all the inventive details is concerned, which are not explained in more detail in this text.

FIG. 2 illustrates the plug-and-socket connector according to FIG. 1 in the locked condition, and FIG. 3 is a plan view of the wrap springs and the optical fibre.

DETAILED DESCRIPTION OF AN EMBODIMENT

Figure 1:
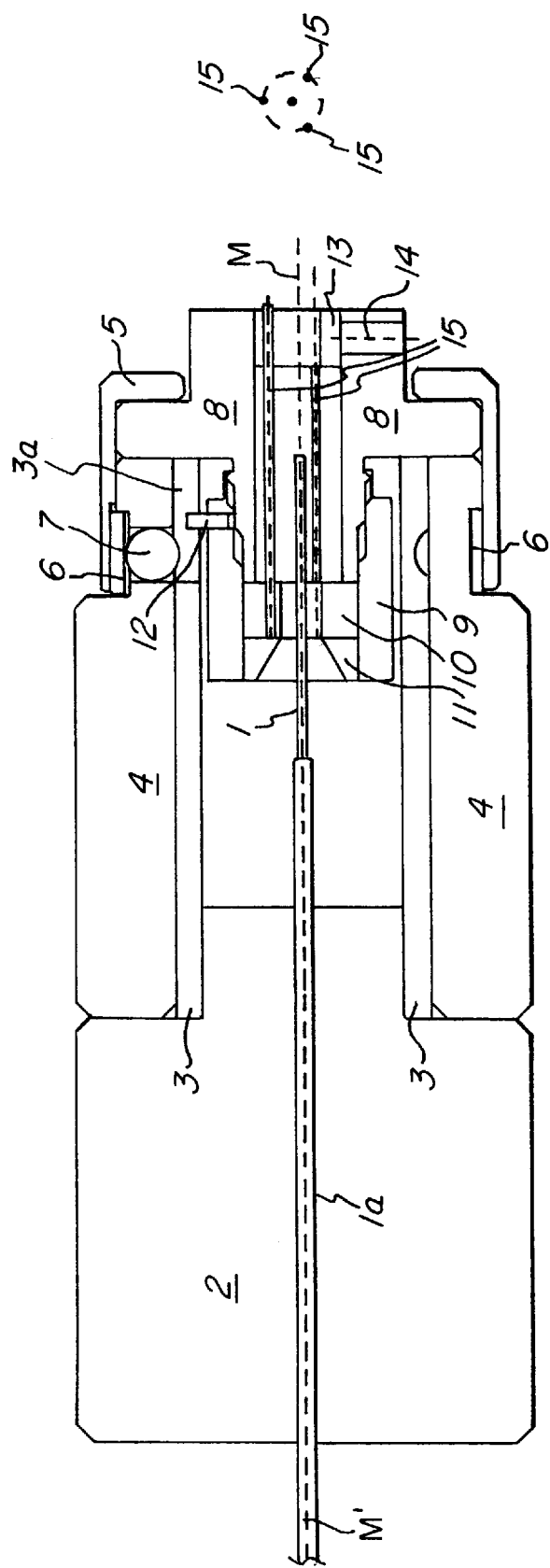
FIG. 1 shows an inventive plug-and-socket connector in the plugged-in but not yet locked condition.

In the following, first of all the individual parts of the plug-and-socket connector will be described, which consist of a socket and a plug:

An optical fibre, which may be a mono-mode or a multi-mode fibre or a bundle of fibres, is fixedly inserted into a socket or clamped therein by its part provided with a cladding element 1a, which socket consists of a grip 2 with a latch 3. The latch 3 presents a slot 3a which has a function to be explained in the following. On its leading end 1 the fibre is stripped and extends beyond the grip 2—and possibly also beyond the latch 3, as is shown in the Figures—so that its leading end 1 may freely oscillate.

The socket may, of course, also present a flange, particularly a rotary flange, instead of a grip or a grip element 2, by which it is mounted, for instance, on the housing of a light source (not represented) or on a catheter etc, (not illustrated either). In an alternative configuration it is possible that the plug, which will be described below, is fastened on a unit or an instrument via a flange (which is fixed in particular).

The plug which is pushed into or onto the socket, respectively, presents a sleeve 4 which is designed for surrounding the latch 3. The sleeve 4 is connected via a rear end piece 5 with a (latching) sleeve 6 inserted therein for receiving a ball 7 to a guiding and stop element 8.

A first fibre holder 10, which carries a centring element 11 of a funnel-shaped configuration, is mounted on the front end of the guiding and stop element 8. A driver 12 is fastened on the sleeve 9.

In the guiding and stop element 8 a second fibre holder 13 is provided which receives a second optical fibre or part of an optical system (not illustrated) having an optical axis M intended to be "aligned" with the optical axis M' of the optical fibre 1 or 1a, respectively. To this end the second fibre holder 13 is clamped in the guiding and stop element 8 by means of a pressing crew 14 after adjustment of the fibres or the fibre 1, 1a, respectively, and the optical system.

Three wrap springs 15 are mounted between the two fibre holders 10 and 13 which are straight in the released or unlocked condition which is illustrated in FIG. 1. This is symbolically represented in the small detail on the right side in FIG. 1.

The wrap springs 15 may be made of quartz, for instance, so that they have the same surface hardness as the optical fibre 1—which, as a rule, equally consists of quartz or a "quartz derivative"—and that they cannot cause damage during locking. The wrap springs may, of course, consist also of another material such as spring steel.

FIG. 1 shows the inventive plug-and-socket connector in the plugged but not yet locked condition:

The sleeve 4 of the plug is pushed onto the socket, which consists of the grip 2 with the latch 3 and the fibre 1a, until the guiding and stop element 8 bears against the latch 3. In this state the latch 3 with its slot 3a is aligned relative to the ball 7 and the driver 12 of the plug.

FIG. 2 illustrates the inventive plug-and-socket connector in the locked condition:

With a locking rotating movement on the grip 2, which is limited via the groove 3b in the latch 3 and the ball 7, the latch 3 drives the sleeve 9 and the first fibre holder 10 with the centering element 11, which is mounted therein, via the driver 12. This results in a homogeneous torsion of the wrap springs 15 between the "driven" first fibre holder 10 and the second fibre holder 13 which is not rotated. This is indicated in the small detail on the right side in FIG. 2.

On account of this rotation the wrap springs 15 close around the fibre 1, centering it precisely in a central position relative to the second fibre holder 13 or the axis M, respectively, of the optical system received therein.

Due to the elasticity of the wrap springs the clamping of fibres 1 or 1a, respectively, of different diameters on the same centre axis M' or M, respectively, is ensured.

The invention has been described in the foregoing by one embodiment, without any restriction of the general inventive idea. Within the scope of this general inventive idea, however, the many different modifications are conceivable.

What is claimed is:

1. A plug-and-socket connector for optical fibers, comprising:
   a socket in which an optical fiber to be connected is retained; and
   a plug for receiving and centering an end portion of said optical fiber inserted into said plug when said socket and said plug are connected together;
   wherein said plug:
      has a first end portion and a second end portion which are rotatable with respect to each other about an axis passing through said first end portion and said second end portion of said plug;
      comprises at least three wrap springs, each of which comprise a cylindrical wire having one end secured to said first end portion of said plug at a position which is radially spaced from said axis at a distance larger than a radius of said optical fiber, and a second end secured to said second portion of said plug at a position which is radially spaced from said axis at a distance larger than said radius of said optical fiber;
      in a released condition said springs are substantially straight and extend at circumferential spacings from each other in a direction substantially parallel to said axis from said first end portion to said second end portion of said plug; and
      upon application of rotational movement of the second portion of the plug with respect to the first portion of the plug, an intermediate portion of each spring is displaced towards said axis to contact and be urged against the circumference of said end portion of said optical fiber inserted into said plug, so that the intermediate portions of all springs grip said end portion of said optical fiber at circumferentially spaced positions of contact and center said optical fiber on said axis.

2. The connector according to claim 1, wherein locking rotating movement is performed by turning the socket.

3. The connector according to claim 2, wherein a part of said plug, on which one end of said wrap springs are retained, is rotated by turning said socket.

4. The connector according to claim 3, wherein said centering is held on said part.

5. The connector according to claim 1, wherein a funnel-shaped centering element is disposed ahead of said wrap springs in the direction of insertion, which element facilitates the insertion of the end of said fiber.

6. The connector according to claim 1, wherein a second fiber holder is provided in said plug for a further optical fiber, with said wrap springs centering said optical fiber on the center thereof.

7. The connector according to claim 6, wherein the other end of said wrap springs is mounted on said second fiber holder.

8. The connector according to claim 7, wherein said second fiber holder comprises adjusting means.

9. The connector according to claim 1, wherein said plug and said socket are adapted to be locked by means of a latch connection.

10. The connector according to claim 9, wherein said latch connection comprises a ball.

11. A plug-and socket connector for optical fibers, comprising:
   a socket in which an optical fiber to be connected is retained; and
   a plug receiving said optical fiber in a centering element into which said optical fiber is inserted when said socket and said plug are connected;
   wherein said plug comprises at least three wrap springs which comprise cylindrical wires extending from a first portion of the plug in a radial position being larger than the radius of said optical fiber substantially parallel to said fiber and ending in a second portion of the plug which is rotatable with respect to the first portion of the plug, and said springs are substantially straight in a released condition and surround and center said optical fiber upon application of a rotational movement of the second portion of the plug with respect to the first portion of the plug.

12. An optical element connector, comprising:

a socket in which an optical element to be connected is retained; and a substantially cylindrical plug, having substantially circular first and second ends in cross section which define a first diameter, the substantially cylindrical plug receiving the optical element;

at least three highly rigid wrap springs, having first and second ends, extending from at least three equidistantly spaced points around the substantially circular first end, the three highly rigid wrap springs passing through the center of the plug and defining a second diameter of the substantially cylindrical plug in cross section such that the second diameter is smaller than the first diameter in both a released and a locked position, the three highly rigid wrap springs continuing to at least three equidistantly spaced points around the substantially circular second end:

wherein the springs are substantially straight in the released position and which surround and center the optical element upon application of rotational movement of the optical element connector.

13. The connector according to claim 12, wherein turning the socket performs locking rotating movement.

14. The connector according to claim 13, wherein the turning rotates a part of the plug on which one end of the wrap springs are retained.

15. The connector according to claim 12, wherein a funnel-shaped centering element is disposed ahead of the wrap springs in the direction of insertion to facilitate the insertion of the optical element.

16. The connector according to claim 12, wherein a second optical element holder is provided in the plug to receive a second optical element, the wrap springs centering the second optical element.

17. The connector according to claim 16, wherein the second ends of the wrap springs are mounted on the second optical element holder.

18. The connector according to claim 16, wherein the second optical element holder comprises adjusting means.

19. The connector according to claim 12, wherein the plug and socket are adapted to be locked by means of a latch connection.

20. The connector according to claim 19, wherein the latch connection comprises a ball.

* * * * *